United States Patent [19]

Ewing et al.

[11] Patent Number: 4,464,932

[45] Date of Patent: Aug. 14, 1984

[54] THERMAL MASS FLOWMETERING

[75] Inventors: James H. Ewing, Brockton; Fred G. Ramberg, Salem, both of Mass.

[73] Assignee: MKS Instruments, Inc., Burlington, Mass.

[21] Appl. No.: 397,109

[22] Filed: Jul. 12, 1982

[51] Int. Cl.³ .............................................. G01F 1/68
[52] U.S. Cl. ..................................................... 73/204
[58] Field of Search ........................................... 73/204

[56] References Cited

U.S. PATENT DOCUMENTS

| | | | |
|---|---|---|---|
| 2,994,222 | 8/1961 | Laub | 73/204 |
| 3,352,154 | 11/1967 | Djorup | 73/204 |
| 3,680,377 | 8/1972 | Lightner | 73/204 |
| 3,938,384 | 2/1976 | Blair | 73/204 |
| 3,942,378 | 3/1976 | Olmstead | 73/204 |
| 4,043,196 | 8/1977 | Trageser | 73/204 |

Primary Examiner—Herbert Goldstein
Attorney, Agent, or Firm—James E. Mrose

[57] ABSTRACT

Metering and related control of fluid flow are achieved both accurately and at high response speed by way of a unique sequencing of thermal exchanges with the fluid under closely-regulated and inter-dependent thermal conditions. The flowing fluid is first conditioned by being raised to a temperature above its highest anticipated ambient, preferably by way of a temperature-sensitive electrical heater resistance which is part of an exceptional self-balancing bridge and control-loop network, and the conditioned fluid is then similarly increased to yet higher temperature, with measurements related to energy involved in producing the second temperature increase being used to characterize the flow. When the fluid is at the same time further conditioned immediately downstream by another similar heating arrangement which allows the fluid to cool to between temperatures developed by the earlier sequencing, the measurements are rendered more stable and can advantageously be made more linearly proportional to mass flow rate. Additional isolation from ambient temperature disturbances is promoted by controlling the environment within which the sequencing of thermal exchanges takes place, preferably by way of a heated enclosure in which electrical regulation of temperature is also swift and exact.

13 Claims, 4 Drawing Figures

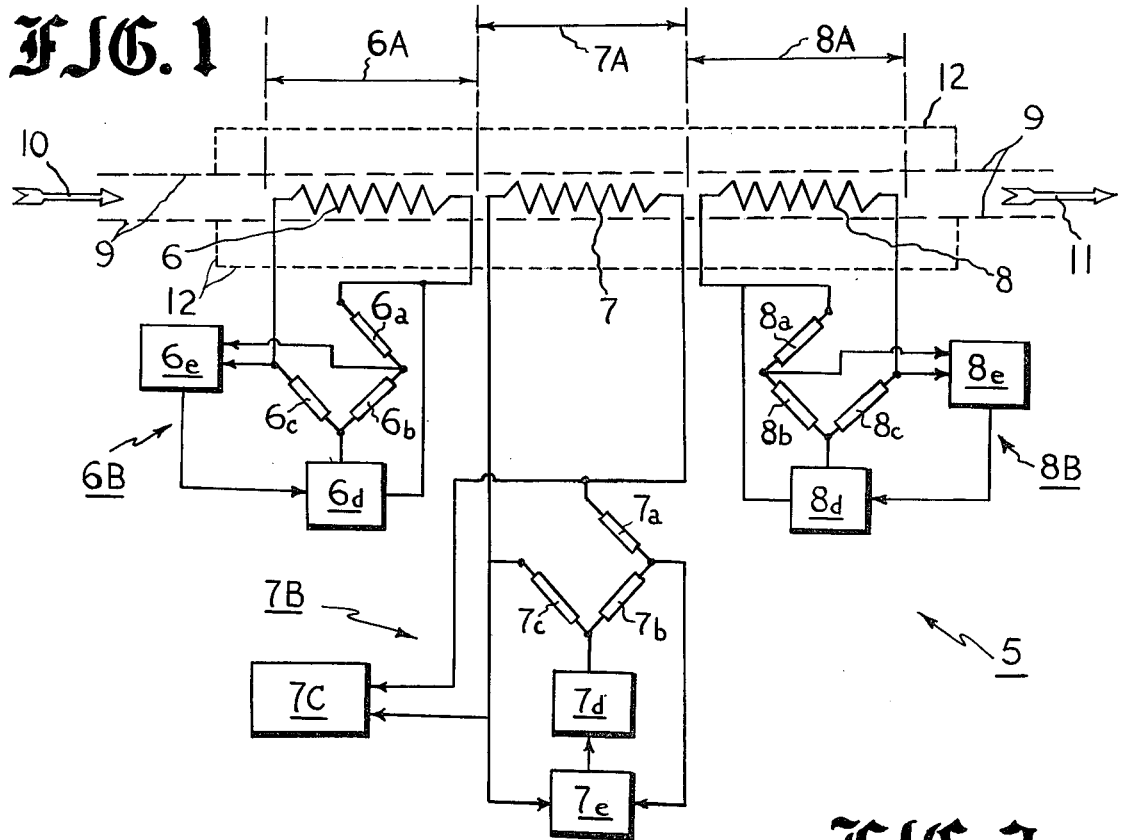
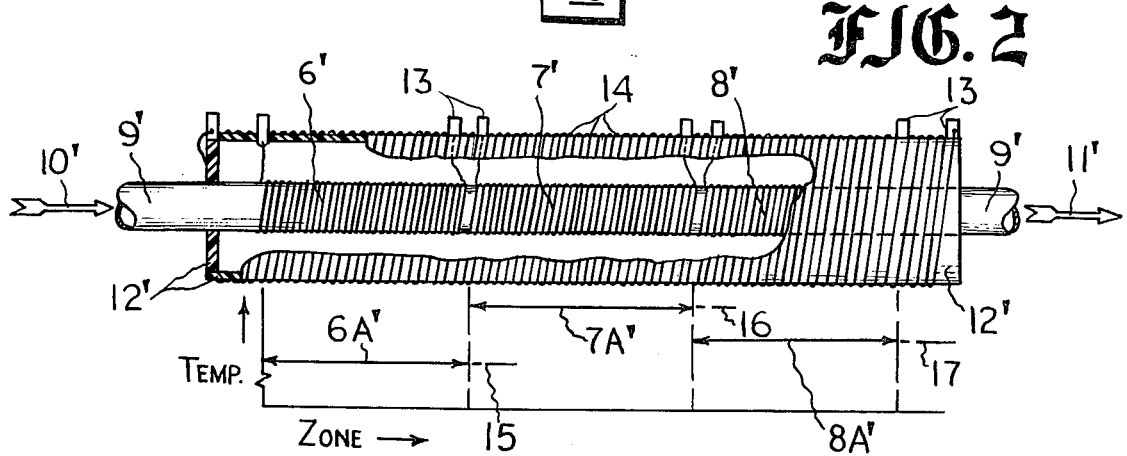
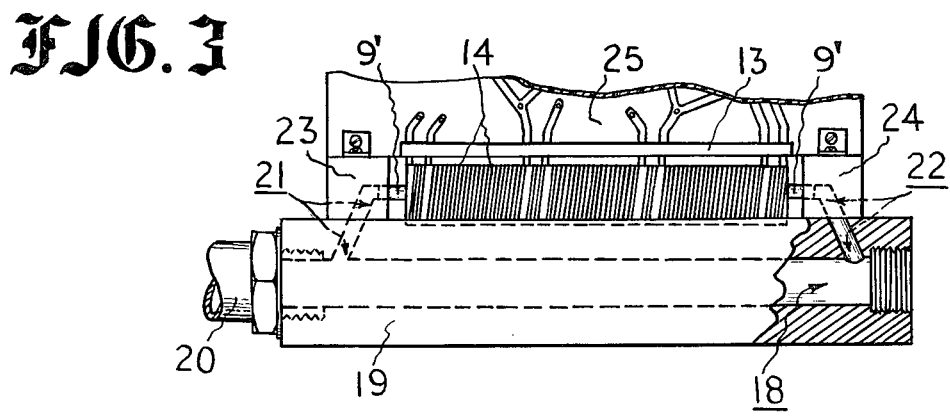

THERMAL MASS FLOWMETERING

BACKGROUND OF THE INVENTION

The present invention relates to improvements in the accurate monitoring of fluid flow by way of thermal exchanges which are uniquely coordinated to suppress lags in response and which advantageously lend themselves to the characterization of mass rate of flow, and, in one particular aspect, to novel, improved and relatively uncomplicated thermal mass flowmetering in which multiple-stage sequenced controlled heatings of a flowing medium automatically condition it to promote exceptional speed of response as well as precision and stability in measurements developed in respect of energy supplied to one of the stages.

Metering of fluid flow may be accomplished in a variety of ways, with the selection of a particular approach commonly being determined by such factors as the composition, volume and flow rates of the fluent materials to be encountered, and by the bulk, costs and power requirements of equipment which will offer desired reliability and precision in the expression of output measurements and/or control in specified terms. For some purposes, only mere rough characterizations of flow may be enough, and fluid-induced movements of relatively simple ball or rotor elements may be viewd or otherwise sensed to provide such information. Positive-displacement pump-type units can be used where volume is the parameter of interest, as can certain vaned-rotor devices, and mass can be calculated with the aid of corrections for density if temperature and viscosity problems are resolved. Pressure-responsive devices, of the venturi, nozzle, orifice and Pitot-tube types, are robust and inexpensive and have been widely used also. Mass rate of flow, and integrations of same into total mass flow, are data which have especially-significant relations to what may be involved in chamically-reacting or energy-dependent processes, or in other supply or dispensing of fluents, and among the efforts to obtain such data directly have been the now well-known angular-momentum devices, such as those involving cooperating impeller and reaction-turbine elements.

Among the classes of instruments which have been popular for gaseous-fluid measurements, in particular, are so-called "hot wire" flowmeters which exploit the principle that a flowing fluid encountering a mass at high temperature tends to cool it to an extent which at least in part depends upon the rate of flow. By way of example of one form of such a thermal flowmeter, it has been known to introduce an electrical heater into a stream, with its supply of electrical power being kept the same, and to interpret the differences between upstream and downstream temperatures as measurements of flow. However, heaters and temperature detectors disposed within a flow stream can upset laminar flow conditions, and such measurements tend to be highly non-linear. Also known is the metering of mass flow by determining temperature differentials between temperature-sensitive heating coils which are in upstream and downstream relations to the fluid and which are elements of electrical bridge circuitry serving both measuring and heating purposes; such flow has been carried in laminar-flow by-pass tubing , with insulation encasing the wound tubing (U.S. Pat. Nos. 3,938,384 and 3,851,526). Recent patent discussions of thermal flowmeters have included that in U.S. Pat. No. 4,297,881, wherein fixed-temperature and fixed temperature difference types of apparatus are distinguished, and wherein related electrical bridge circuitry has been described. And, in U.S. Pat. No. 4,300,391, hot-wire anemometers and problems commonly associated with them are reviewed. Probe-mounted wire-type resistances for mass flow measurements appear in U.S. Pat. No. 4,304,128, and silicon resistances and thin-film metal resistances are involved in the flowmeters of U.S. Pat. Nos. 4,319,483 and 4,320,655, for example.

SUMMARY OF THE INVENTION

In accordance with certain aspects of the present teachings, it is recognized that operation of thermal flowmeters and of systems they control can be improved significantly, particularly in respect of factors related to critical speed of response, by establishing controlled temperature distributions which effectively eliminate dependencies upon relatively long thermal time constants imposed by materials of which the metering flow paths are fashioned. A preferred embodiment of the invention involves a thermal flowmeter in a bypass measurement pathway associated with a main flow line through which gas travels under control of a valve operated in response to the flowmeter measurements. The measurement pathway is defined by an elongated flow tube about which are three distributed windings made of high-temperature-coefficient resistance wire and arranged proximately end-to-end, in three sections sequentially in direction along the bypassed stream of laminar flow. The winding in the most upstream relation is energized to insure that the fluid will be raised to a first temperature which is above its highest anticipated ambient values. Immediately downstream thereof, the next winding functions as a primary measurement element, with the power, voltage-drop, or current parameters of the electrical energy supplied to it while it heats the fluid to a yet higher second temperature being interpreted to characterize the flow which is taking place. Thermal time constant of the measurement pathway, which would essentially be the lag involved in the flow tube's assuming a new equilibrium temperature after a flow change occurred in a flowmeter not including the aforementioned upstream winding section, is advantageously reduced to relative insignificance and, instead, the primary factor inherently affecting speed of measurement response appears to be mere transport delay, that is the normally very short time necessary for a changed condition of flow in the system to reach the primary measurement element. The third winding is in turn in downstream adjacent relation to the primary measurement element, and is energized to bring about a controlled cooling of the fluid to a temperature between the first and second temperatures. That third section not only reduces disturbance of thermal conditions which might otherwise adversely affect the system measurements but also contributes to a highly meritorious linear proportionality which can be realized between mass flow rate and voltage drop across the primary winding element. That linear relationship facilitates electrical control of motor-driven valving of system flow. In taking full advantage of the intrinsic high-response-speed capabilities of such flowmetering, the heatings regulated by the various windings, and related measurements performed by way of the primary element, should involve no appreciable lags, and, to that end, each temperature-sensitive winding is made part of an electrical bridge network which is virtually instantaneously balanced, automatically, via associated operational amplifier and power transistor circuitry. Where uncontrolled environmental ambient temperature variations might otherwise interfere with the flowmetering, immunity is promoted by providing stabilized-temperature artificial environs for the wound flow tube, preferably involving an electrically-heated enclosure in which the automatically-regulated temperature is higher than any expected ambient.

Accordingly, it is one of the objects of the present invention to provide for unique and advantageous flowmetering wherein a coursing fluid is first accurately regulated in temperature and then immediately varied in temperature by a predetermined amount, the energy exchanges involved in the induced temperature variation being taken to characterize the flow.

Another object is to provide a novel and improved method for precisely characterizing fluid flow at high speeds of response, in which there are sequential closely-controlled heatings of the fluid and in which mass flow rate is related to energy expended in raising the fluid temperature to a predetermined extent from an artificially-raised fixed value.

A further object is to provide sensitive and stable flowmetering apparatus of relatively uncomplicated and low-cost construction which is capable of responding to fluid flow variations with exceptional speed, and involving sequentially-disposed electrical-resistance heaters through which reference-temperature conditions are established and a prescribed change in temperature is effected with attendant expenditure of energy related to flow on a virtually instantaneous basis.

Still further, it is an object to provide a distinctive thermal flowmeter, particularly beneficial in applications such as those of flow-regulating systems requiring high-response-speed control of mass rate flow of gaseous fluid, wherein three electrical heaters, each made of high-temperature-coefficient material, are disposed in self-balancing bridge networks through whose rapid actions predetermined temperature conditions are caused to be exhibited by flowing gas in upstream and downstream relation to a primary measurement site and the temperature at the latter site is raised by a predetermined amount while flow is characterized virtually instantaneously by its relation to energy involved in raising the temperature.

BRIEF DESCRIPTION OF THE DRAWINGS

Although the aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 is a partly schematic and partly block-diagrammed representation of cooperating portions of an improved flow-metering arrangement in accordance with the present invention, together with characterizations of sequential-flow sections across which prescribed temperature distributions are developed;

FIG. 2 portrays a flow-tube sensor expressing certain of the present teachings and including three stages of externally-wound high temperature-coefficient wiring, within an environment-regulating enclosure;

FIG. 3 illustrates, partly in cross-section, a flow transducer assembly in which an improved flow-tube sensor is mounted in by-pass relationship with a flow conduit.

DETAILED DESCRIPTION OF THE PREFERRED EMBODIMENTS

Figure 4:
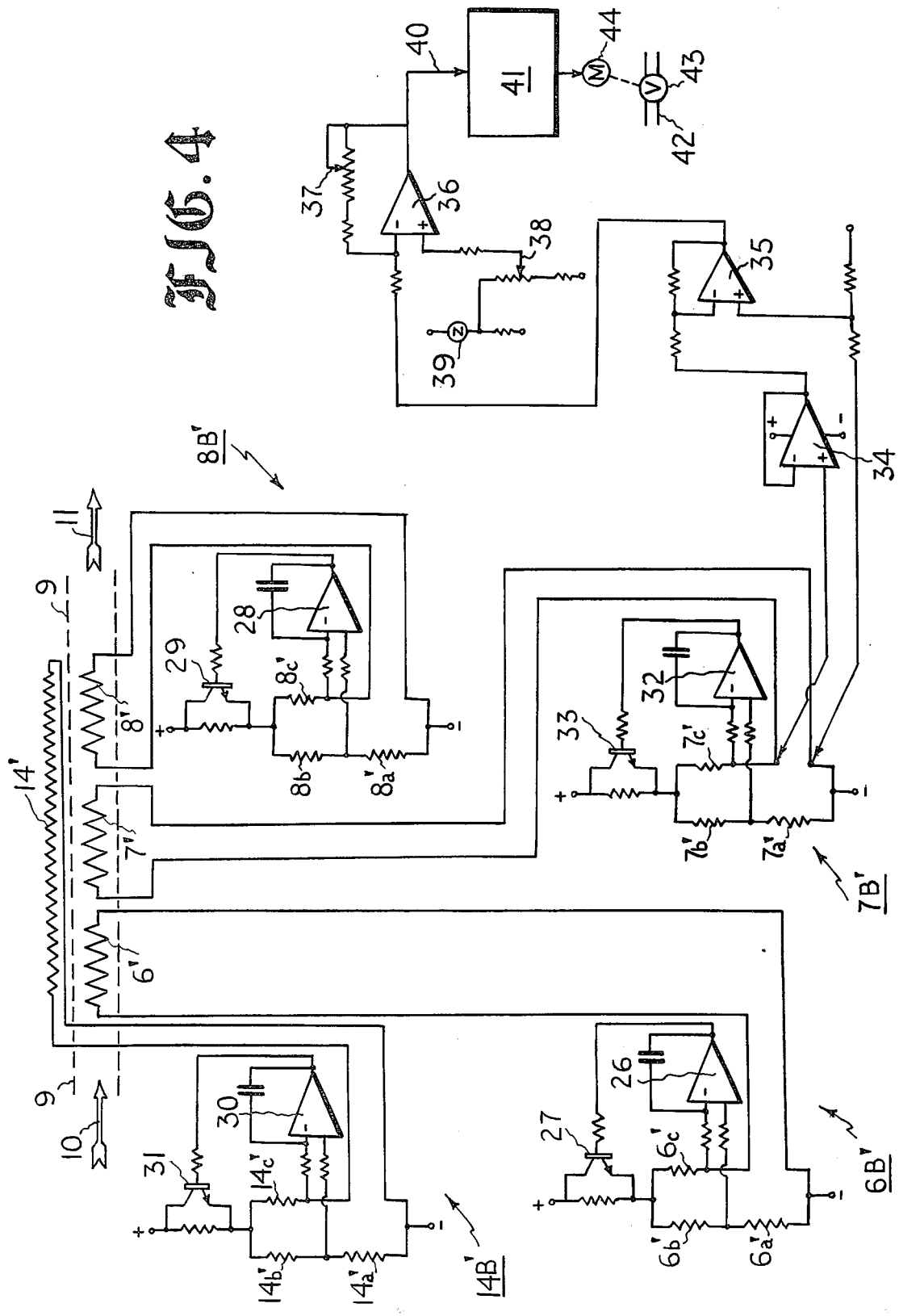
FIG. 4 provides schematic and block-diagrammed details of circuitry for an electrical valve controller in which high response speeds are promoted by the improved mass rate flowmetering.

Having reference to the drawings, wherein like reference characters designate identical or corresponding components and units throughout the several illustrations, and, more particularly, to FIG. 1 thereof, one embodiment of a unique thermal flow-metering arrangement 5 is shown to include electrical heat-exchange elements 6, 7 and 8 disposed in that sequence in relation to a flowing stream of fluid whose laminar-flow coursing along a pathway defined by dashed-line boundaries 9 is characterized by upstream arrow 10 and downstream arrow 11. The elements 6–8 are readily expressed in the form of electrical resistances, such as wire, which can be heated by currents forced through them and which are themselves highly temperature-sensitive by virtue of their fabrication from high-temperature-coefficient material (such as wire exhibiting a positive coefficient of +3500 ppm/°C. The effects of each such element are purposefully distributed along the flow path, such that related interactions with the fluid may be complete even when its rates of flow are high, and the successive distributions are in proximate end-to-end relationships which tend to minimize lags between the interdependent actions of the three cooperating elements. The first such distribution, 6A, must initially provide a critical conditioning of the oncoming fluid, and it therefore spans a section of the flow pathway which is immediately upstream of the similarly-distributed primary measurement element 7. Under control of an automatically-rebalancing bridge network, 6B, of which it is a part, the distributed element 6 adds such heating to the flowing fluid as will assure that the fluid temperature becomes regulated at a first level which is in excess of any temperatures the fluid might normally be expected to have as it enters the flowmetering arrangement. Immediately thereafter, the measurement element 7, having a distribution 7A along the flow pathway, adds heat to the flowing fluid under control of a second automatically-rebalancing bridge network, 7B, of which it in turn is a part. The second stage of heating has important sensing or measurement significance, because the energy involved is related to the flow taking place. Specifically, when it is assured that all the flowing fluid is being heated to a known extent from a known level by element 7, then it is found that the energy involved can be interpreted as a measure of mass rate of flow. For such purposes, the arrangement in FIG. 1 includes a measurement unit, 7C, coupled across element 7 and responsive to voltage drops across it as its bridge network 7B forces heating currents through it to varying extents as called for by different conditions of flow at different times. A cardinal advantage resulting from the close regulation of the fluid's temperature just in advance of its entry into pathway section 7A is the exceptional contribution which this makes in respect of speed of response of the flowmeter. Relatively sluggish thermal time constants of parts of the flowmeter structure, which might otherwise have to be adjusted to new equilibrium temperatures with each flow change, can be discounted as a significant factor, and, instead, very rapid response speed of the improved flowmetering arrangement appears to be determined mainly by so-called "transport delay", which is time needed for an upset in flow to reach the measurement element 7. In turn, if the associated heating and measuring and control networks also exhibit high-speed responses, operations can be made virtually instantaneous and isolated from inherent lags which might otherwise persist as the source of serious flaws.

The third heat-exchange element, 8, immediately downstream of measurement element 7, is likewise a heater having its effects distributed over a length, 8A, of the flow pathway. Temperature of the fluid is there regulated with reference to a level which is preferably between those associated with the upstream and midstream sections 6A and 7A, and an automatically-rebalancing-bridge network 8B of which element 8 is a part implements that regulation. It is to be noted that the ongoing fluid is allowed to cool somewhat after being critically further heated in measurement section 7A, even though the downstream conditioning section 8A into which it then flows is also being supplied with heat, albeit with reference to a lower temperature level, by element 8. The controlled cooling which is effected in that way exerts a desired influence upon the measurements, and has the distinctly advantageous effect of rendering the voltage drops across measurement element 7 substantially linearly proportional to mass flow rate. In other arrangements, for example, the relationship may be substantially hyperbolic, and associated displays or controls would have to cope with disadvantages inherent in such non-linearity. The temperature profile which is developed along the flow pathway by the interacting sections is one in which the fluid is established at a first temperature when it enters the measurement midsection 7A, and in which the temperature is then increased to some higher level and subsequently allowed to cool, under controlled conditions, to a lesser second temperature by the time it reaches the position where it exits that midsection. However, the average temperature experienced over the midsection or distributed-heating stage 7A is always maintained substantially constant, regardless of changes in flow, and it is the power required to establish a given average temperature, once the fluid has first been separately conditioned to reach a regulated lower temperature, which characterizes the mass flow rate. Measurement of that electrical power, or the current associated with it, can give useful information, but, as has already been said, the voltage drop across element 7 bears a linearly proportional relation to the mass flow rate and is therefore a preferred parameter for measurement.

The three automatically-rebalancing bridge networks 6B, 7B and 8B are generally similar, with the high-temperature-coefficient resistance elements 6, 7 and 8 each separately forming one leg of a conventional type of full bridge, the other three legs, 6a–6c and 7a–7c and 8a–8c, respectively, being made up of substantially constant impedances having relatively low temperature-coefficients such that bridge balance in each case will not be significantly affected by changes in power which must be handled as the heating resistance elements are powered differently under changing conditions requiring deliveries of different amounts of heat. The respective power sources, 6d, 7d and 8d, energize the bridge across their input points in accordance with dictates of the control units 6e–8e which respond to bridge unbalance conditions appearing across the bridge output terminals. Impedance which the measurement unit 7c displays to the primary measurement resistance element 7 is relatively very high, and it is therefore essentially isolated from and does not materially affect either the bridge balancing or the element heating. In each case, as the fluid flow starts to cool one of the elements below its intended temperature, its resistance drops, its associated bridge becomes unbalanced, the unbalance is at once detected by the cooperating control unit, and the source powering its bridge is immediately caused to deliver greater power and thereby further heat the element. The reverse process occurs, automatically and substantially instantaneously, as heating above the intended temperature commences.

Temperature variations in the ambient environment within which the flowmetering occurs can degrade its operation, and are therefore best isolated by way of an enclosure such as that characterized by dashed linework 12 in FIG. 1 and by the tubular counterpart thereof, 12', in FIG. 2. Although a simple thermally-insulating enclosure about the flow pathway and distributed heater and measurement elements can provide some advantage, a preferred isolation and attendant improvement of flowmeter operation are realized through regulation of the immediately-surrounding temperature to a substantially fixed value which is in excess of any ambient temperature expected to be encountered in intended use of the apparatus. For such purposes, the flow tube 9' (FIG. 2) is enveloped by the hollow cylindrical tube 12' which spans its inlet, measurement and outlet sections 6A', 7A' and 8A' and their associated distributed heating and measurement elements 6', 7' and 8'. A suitable heat-resistant insulating tube 12', supported by closures at its ends, is shown suitably spaced radially from the thin-walled and elongated stainless-steel sensor tube 9', and it conveniently serves as a carrier for a printed circuit board insert 13 to which are connected the ends of the section windings 6', 7' and 8' distributed along the outside of the tube 9' in intimate heat-exchange but electrically-insulated relationship with it. An electrical-resistance heater winding 14 is distributed along the exterior of the ambient-isolating tubular enclosure 12', and is preferably made of high-temperature-coefficient wire so that, like the section windings 6', 7' and 8', it may advantageously be made part of a dynamic automatically-regulating network which both senses temperature and supplies heat as it is needed. Flow tube 9' is designed to promote laminar flow conditions, which are preferred for the flowmetering under discussion, and in one practice is made very small (example: an inner diameter of 0.025 inch and a length of about 3 inches) while preserving a desired ratio of inner diameter to length of about 1:100 so as to foster those flow conditions. With reference to the temperature-zone axes displayed as part of FIG. 2, it may be noted that, in accordance with what has already been described in relation to FIG. 1, the heating by winding 6' should cause the gaseous fluid flowing through the inlet section or zone 6A' to reach a predetermined temperature level 15, and that the average temperature regulated for the subsequent flow through the measurement zone 7A' should be at a higher level, 16, and that the next control of temperature, in outlet zone 8A', should involve a drop, such as one to the illustrated level 17. The actual transitions in temperature of the fluid as it sequentially traverses these zones are of course gradually-changing ones and vary with the flow conditions. For example, in the inlet zone 6A', the incoming fluid temperatures may be either near or much lower than level 15, and they must therefore be raised by either small or large amounts in one given length of that zone, and both the fluid density and the speed at which the fluid is travelling will effect the quantity of heat which must be supplied during whatever time is remains in transit in that zone. And, in addition, the "end" effect at the downstream end of winding 6', which is close to and influenced by a heated upstream end of the heated measurement winding 7', can be expected to be different from that at the upstream end where the oncoming fluid may have different degrees of warmth or coolness. Such "end" effects are likewise present in the case of the measurement winding 7', but its upstream end should witness a relatively stable temperature at level 15 while its downstream end experiences variable lowerings in temperature which depend upon the cooling allowed by the adjacent variably-heated but relatively cooler outlet winding 8'. The latter interactions, between the downstream portion of measurement winding 7' and the outlet winding 8' proximately downstream of it, are very important because they promote the aforementioned linear proportionality to mass rate of flow. Even in absence of such an outlet winding, there is a useful sensing and/or measurement relation between flow and the heating taking place in the measurement zone. Preferably, however, there is such a controlled relative cooling downstream. Although the "profile" of temperature variations across the measurement zone is variable with flow, and first has a positive-slope increase for some distance followed by a negative-slope decrease over the remainder of the zone, the average temperature remains substantially the same for all conditions of flow within a flow range for which the apparatus is designed. Preserving that average temperature involves expenditures of heating energy which vary with the flow and characterize it quite faithfully.

One practical structural configuration for the flowmeter is depicted in FIG. 3, where the flow tube 9' is coupled in by-pass relation to a flow line 18 running through a stainless steel base, 19 which at its ends has internally-threaded ports for connections such as that with the upstream fitting 20. Channels 21 and 22, through which the fluid is by-passed from flow line 18 through the small flow tube 9', are formed partly through the base and partly through mounting and coupling brackets 23 and 24, respectively. Connection tabs 13, and further like tabs for the ambient-regulating heater winding 14, are disposed for fitting with cooperating edge connectors of a printed-circuit board 25, the latter carrying the associated electrical bridges and other circuitry and components used in conjunction with the sensor.

As to the last-mentioned items, FIG. 4 provides circuitry and other details for a preferred embodiment of flowmetering system, including three electronic control units 6B', 7B', 8B', which are counterparts of those identified by similar reference characters in FIG. 1, together with a fourth like control unit 14B' serving the resistance heater winding 14' which regulates the ambient environmental temperature witnessed by the upstream conditioning winding 6', midstream primary measurement winding 7' and downstream conditioning winding 8'. The latter three windings are distributed in heat-exchange relationships with the fluid passing through the laminar-flow conduit or flow tube 9, and have substantially continuous distributions along respective upstream, midstream and downstream portions of the sensor. Having reference to control unit 6B', for example, it will be noted that the relatively high-temperature coefficient material of upstream conditioning winding 6' is in one arm of a full bridge, the other three arms of which include only relatively low temperature-coefficient resistances 6a', 6b' and 6c', and that bridge output is sensed by an operational amplifier 26 which virtually instantaneously drives the power booster transistor 27 to change currents forced through the bridge winding resistance 6' as needed to regulate the fluid temperature. In the case of the control unit 8B' associated with downstream conditioning winding 8', there is a like operational amplifier, 28, driving a power booster transistor, 29. Similarly control unit 14B' includes the ambient environmental heating resistance 14' as one high-temperature-coefficient arm of a full bridge in which the remaining arms 14a'-14c' have negligibly low temperature coefficients, and a bridge-responsive operational amplifier 30 there drives the power booster transistor 31 to vary the heating current as sensed ambient temperature conditions vary. Operational amplifier 32 and power booster transistor 33 serve comparable functions in respect of operation of control unit 7B' which includes the primary measurement winding 7'. However, the voltage drops developed across that particular winding, 7', are particularly significant from a flow-measurement standpoint, and, as has been said, can be expected to be substantially linearly proportional to mass rate of flow. Accordingly, those voltages are tracked on a continuous basis, without affecting either the heating or temperature-sensing being performed by winding 7', by way of an isolating high-impedance follower amplifier, 34. Subsequent amplification is performed by amplifiers 35 and 36, with a gain adjustment being afforded by potentiometer 37 and a set-off being introduced via potentiometer 38 in relation to a reference established by a Zener device 39. The latter set-off is aimed at compensating for such system effects as may tend to show up in measurements under no-flow or "zero" conditions, for example: The sensed and processed mass-rate-of-flow signals carried by output coupling 40 are applied to a suitable end device 41, such as a known type of indicator, recorder or controller. Where the flow sensor is used as part of a system which controls fluid delivered through a main line, 42, way of a valve, 43, the controller 41 then suitably actuates a motor or like valve actuator, 44.

In appropriate instances, the mass rate of flow measurements may be integrated to yield total mass flow. Also, additional by-passing arrangements can be employed to multiply the ranges of measurements which may be performed with one design of flowmeter. Although one form of full electrical bridge has been shown and described, there are others which can be exploited to obtain similar results, including those which may perform temperature measurements separated by way of one of a pair of windings while heating is being induced by another of the pair. The "windings" need not be helical, and conductive films or other equivalents of wire may of course be substituted. Straight laminar-flow conduits are preferred for the gas-flow flowmetering which has been discussed, but sensors which are non-linear and/or have non-uniform cross-sections may exploit these teachings and may handle flows of liquids, slurries and other mixtures. The currently-preferred embodiment involves three winding sections, with the winding most downstream being a heater which allows fluid to cool to temperature between the upstream regulated temperature and the average of the midstream temperatures; however, where a degree of sluggishness and non-linearity in response can be tolerated and/or compensated for, that downstream temperature need not lie between the others. Also, while it is now preferred that the characterizing of flow be accomplished by way of a measurement section which is just downstream of a first section in which the fluid temperature is regulated above, or below, the ambient temperatures at which the oncoming fluid might be encountered, it is possible to take useful flow-related information from any one or more of the multiple sections. For example, in the latter connection, the energy or related effects of energy supplied to upstream winding 6, and/or downstream winding 8, and/or winding 7 and either or both of windings 6 and 8, may be characterized to sense flow and to provide measurement or control. Accordingly, it should be understood that the specific embodiments and practices herein described have been presented by way of disclosure rather than limitation, and that various modifications, combinations and substitutions may be effected by those skilled in the art without departure in spirit or scope from this invention in its broader aspects and as set forth in the appended claims.

What we claim as new and desire to secure by Letters Patent of the United States is:

1. Flowmeter apparatus comprising conditioning means for regulating the temperature of a flowing fluid by exchanging heat therewith in response to a supply of energy, thermal means disposed in heat-exchange relationship with the fluid regulated in temperature by said conditioning means for both exchanging heat with the fluid and for electrically characterizing temperature changes caused by flow of the fluid, control means responsive to temperature changes as characterized by said thermal means and supplying energy to said thermal means which changes the temperature of the fluid from the level of its regulated temperature to different values, thermal output conditioning means for regulating the temperature of the fluid immediately downstream of said thermal means to temperature between said level and the average of said different values, and flow measurement means characterizing energy supplied to at least one of said conditioning means and said thermal means, said control means supplying energy to said thermal means which maintains the said average of said different values of temperature substantially constant.

2. Flowmeter apparatus as set forth in claim 1 wherein said thermal means includes thermally-sensitive electrical resistance material, and wherein said control means supplies electrical currents to said electrical resistance material to thereby change temperature of the fluid, and wherein said flow measurement means characterizes voltage drops across said resistance material, said voltage drops being substantially linearly proportional to mass rate of flow of the fluid.

3. Flowmeter apparatus as set forth in claim 2 wherein flow measurement means comprises relatively high-impedance means electrically connected across said resistance means and responding to voltage drops thereacross without diverting significant electrical current therefrom or significantly affecting its effective temperature-resistance characteristics.

4. Flowmeter apparatus comprising conditioning means for regulating the temperature of a flowing fluid by exchanging heat therewith in response to a supply of energy, thermal means disposed in heat-exchange relationship with the fluid regulated in temperature by said conditioning means for both exchanging heat with the fluid and for electrically characterizing temperature changes caused by flow of the fluid, control means responsive to temperature changes as characterized by said thermal means and supplying energy to said thermal means which changes the temperature of the fluid from the level of its regulated temperature to different values, thermal output conditioning means for regulating temperature of the fluid immediately downstream of said thermal means in response to a supply of energy, and flow measurement means characterizing energy supplied to as least one of said conditioning means and said thermal means and said thermal output conditioning means.

5. Flowmeter apparatus comprising conduit means having a flow passageway therethrough, conditioning means for regulating the temperature of a flowing fluid by exchanging heat therewith in response to a supply of energy, thermal means disposed in heat-exchange relationship with the fluid regulated in temperature by said conditioning means for both exchanging heat with the fluid and for electrically characterizing temperature changes caused by flow of the fluid, said thermal means being disposed in said heat-exchange relationship with the fluid in a substantially continuous distribution along a measurement portion of said passageway and exchanging heat with the fluid by raising the temperature thereof above that of the regulated temperature, control means responsive to temperature changes as characterized by said thermal means and supplying such energy to said thermal means as maintains the average temperature along the said measurement portion of said passageway at a substantially fixed level higher than that of said regulated temperature, flow measurement means characterizing energy supplied to said thermal means by said control means, thermal output conditioning means disposed in heat-exchange relationship with the fluid immediately downstream of said measurement portion of said passageway for both regulating the fluid temperature downstream of said measurement portion and for electrically characterizing temperature changes as caused by the fluid, and downstream control means responsive to temperature changes as characterized by said output conditioning means for regulating the temperature of fluid downstream of said measurement portion by heating it as needed to realize a cooler temperature thereof higher than said regulated temperature but lower than said average temperature.

6. Flowmeter apparatus as set forth in claim 5 wherein said output conditioning means includes thermally-sensitive electrical resistance material having a relatively high temperature coefficient of resistance, and further including an electrical bridge including said material in an arm thereof and only resistance having relatively low temperature coefficient of resistance elsewhere in said bridge, and downstream control means including electronic means valving electrical current flow from a source through said bridge responsive to electrical outputs from said bridge and thereby causing said material to become heated by said current flow and to regulate the temperature to realize said cooler temperature.

7. Flowmeter apparatus as set forth in claim 5 further comprising environment regulating means regulating the ambient temperature about said conditioning means and said thermal means, said environment regulating means including a heater artificially and automatically holding said ambient temperature at a level above expected temperatures of the natural environment in which the apparatus is used.

8. Flowmeter apparatus as set forth in claim 5 wherein each of said conditioning means and thermal means and output conditioning means includes a separate element of thermally-sensitive electrical resistance material having a relatively high temperature coefficient of resistance disposed in heat-exchange relationship with the fluid in a substantially continuous distribution respectively along an upstream portion of said passageway and along said measurement portion immediately downstream thereof and along an outlet portion of said passageway immediately downstream of said measurement portion, and wherein the elements of said material are each in an arm of a separate electrical bridge otherwise including only resistance having relatively low temperature coefficient of resistance, and further comprising upstream control means associated with said conditioning means, and wherein said control means and upstream control means and downstream control means each separately includes electronic means valving electronic current flows from sources through the respective electrical bridges responsive to electrical outputs therefrom and thereby respectively cause said elements of electrical resistance material to be heated in accordance therewith.

9. The flowmetering method which comprises conditioning a flowing fluid by regulating its temperature, then changing the temperature of the regulated-temperature fluid to different values in a midstream heat-exchange operation as the fluid flows on, then further conditioning the fluid after changing the temperature thereof by again and separately regulating its temperature in a downstream heat-exchange operation immediately following said changing, and characterizing the energy expended in at least one of the three steps of regulating the temperature and changing the temperature and again regulating the temperature.

10. The flowmetering method which comprises conditioning a fluid by distributing heating of the fluid along a substantially continuous upstream path of flow thereof to realize a first temperature thereof in excess of expected temperatures of the fluid before it is conditioned, then changing the temperature of the regulated-temperature fluid to different valves of temperature in a heat-exchange operation which involves distributing further heating of the fluid along a substantially continuous downstream path of flow immediately downstream of the upstream path, further conditioning the fluid after changing the temperature thereof by supplying to it immediately downstream of the downstream path of flow only such heat as allows the fluid to cool to temperature between the said first temperature and the average of said different values of temperature, supplying and monitoring energy required for the distributed further heating of the fluid, and characterizing mass rate of flow in substantially linear proportionality to that energy.

11. The flowmetering method as set forth in claim 10 which further comprises maintaining and performing the steps of conditioning and changing the temperature and further conditioning in a substantially constant-temperature environment which is above expected temperatures of the natural ambient environment.

12. The flowmetering method as set forth in claim 10 which comprises maintaining laminar flow of the fluid while simultaneously and continuously performing the steps of conditioning and changing the temperature and further conditioning.

13. The flowmetering method as set forth in claim 10 in which each of said steps of conditioning and changing the temperature and further conditioning comprises both sensing temperature and heating the fluid simultaneously by responding to electrical resistance of and developing related electrical heating of temperature-sensitive material having relatively high temperature-coefficient of resistance, and wherein characterizing mass rate of flow involves measuring voltage drops across the temperature-sensitive material used in the step of changing the temperature.

* * * * *